June 22, 1943.    R. P. LOWE    2,322,374
CONTROL APPARATUS
Original Filed Aug. 13, 1938
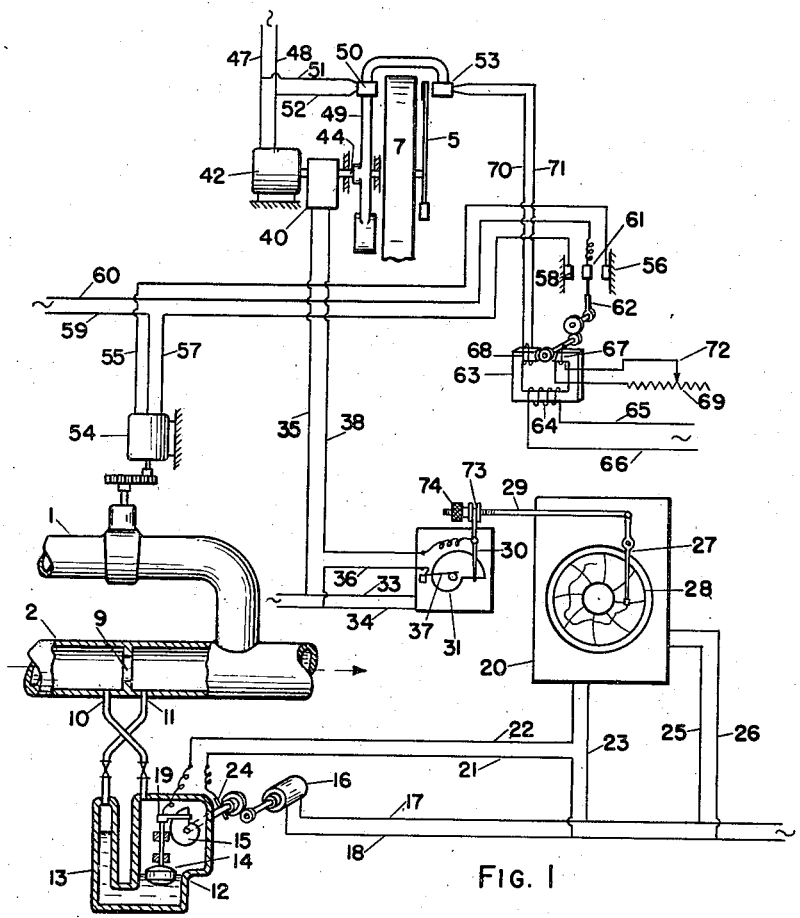
Fig. 1
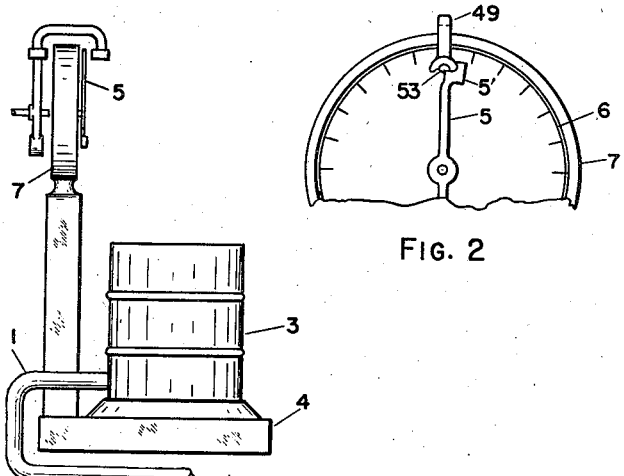
Fig. 2
Fig. 4
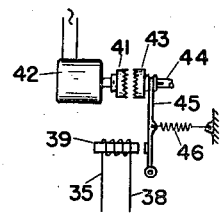
Fig. 3
RUDY P. LOWE
INVENTOR.
BY Maxwell Barus
Attorney Patented June 22, 1943

2,322,374

UNITED STATES PATENT OFFICE 2,322,374

CONTROL APPARATUS

Rudy P. Lowe, East Providence, R. I., assignor to Builders Iron Foundry, Providence, R. I., a corporation of Rhode Island Original application August 13, 1938, Serial No. 224,828. Divided and this application February 25, 1941, Serial No. 380,473

2 Claims. (Cl. 137—165)

This invention relates to the control of the rate of feed of a substance. An object is the provision of a novel means for controlling the rate of feed of a substance in accordance with a master quantity. A further object is the attainment of a novel control which is especially precise and accurate, while at the same time simple and expeditious.

The invention further provides a novel and advantageous means for telemetrically controlling a quantity at a distant point.

A feature of the invention comprises means responsive to loss of weight of material from a given source and means cooperating with the first mentioned means for regulating the feed of the substance in correspondence with a master quantity. The invention further includes, more specifically, provisions for the transmission of values of a master quantity by cyclical signals of a function of time corresponding to said values, in combination with means responsive to loss of weight of the source of feed of a substance and cooperating with means responsive to said signals for controlling the rate of feed of said substance.

A further feature of the invention comprises the integration of rate of loss of weight of the source from which the substance is fed, the integration of values of a master quantity, and the regulating of the quantity rate of feed of the substance so that a given relation between said integrations is maintained.

Other features and advantages of the invention will be hereinafter described and claimed.

The present application is a division of my application Serial No. 224,828, filed August 13, 1938.

In the accompanying drawing:

Fig. 1 is a diagrammatic view, with parts in elevation and parts in vertical section, illustrating an embodiment of my invention, as applied to controlling the feed of a liquid substance.

Fig. 2 is a fragmentary front elevation illustrating the cooperation between a weight-responsive member and a light-sensitive means included in the control system of Fig. 1.

Fig. 3 is a detail view showing an electromagnetic clutch means which may be employed in said system.

Fig. 4 is a diagrammatic view showing a container for the liquid to be controlled, mounted on a weighing apparatus in said control system.

While the utility of the invention is obviously not restricted to any particular substance, it is illustrated in Figure 1 as applied to the control of feed of a liquid in a conduit 1 in proportion to the rate of flow of another liquid in the conduit 2. The liquid in said conduit 2 may, for example, be gasoline, and the liquid in the conduit 1 may, for example, be an ethyl compound with which gasoline is treated to produce the well-known "ethyl gasoline." The conduit 1 is connected to a container 3, or other suitable source of liquid, mounted on a scale 4 of any suitable or conventional construction. The latter includes a weight-responsive hand or pointer 5 rotatable over the graduated face 6 of the scale head 7. Said hand rotates in response to loss of weight of the container contents, and its position at any instant on the face 6 corresponds with the actual weight at that instant and its rate of travel across the face 6 corresponds to the rate of loss of weight from the container 3.

The pipe or conduit 2, in which liquid is flowing in the direction of the arrow, is provided with a differential producer, such as an orifice plate 9. Connected to said conduit on opposite sides of said plate 9 are taps 10, 11, which lead to the respective legs 12, 13 of a conventional U-tube containing a manometric liquid such as mercury. A float 14 rests upon the surface of said liquid in the leg 12 and is thus positioned in accordance with the differential pressure between points 10 and 11, or, in other words, in correspondence with the square of the rate of flow of the liquid in the conduit 2. Cam 15 is continuously rotated at constant speed by synchronous motor 16 energized from a suitable current source to which it is connected by wires 17, 18. Secured to the stem of the float 14 is a contactor 19, adapted to engage the face of the cam 15. Due to the shape of said cam, the duration of engagement between said cam and the contactor 19 in each cycle of rotation of said cam is proportional to the square root of the differential pressure between points 10 and 11, and is thus proportional to the rate of flow of the liquid in the conduit 2. Said cam and contactor are adapted to close a circuit through a suitable indicator or recorder apparatus 20, through wires 21, 22, and 23. As shown, wire 21, connected to a suitable current source, supplies current to cam 15 through a brush 24 engaging the shaft of said cam, while wire 22 connects the contactor 19 with the recorder, the latter being in turn connected by wire 23 with said source.

Wires 25, 26 connect a suitable current source with a continuously operating constant speed motor in the apparatus 20 for operating the pen arm or indicator 27 under the control of the impulses received from cam 15 and contactor 19.

In each cycle the cam 15 and contactor 19 close a circuit through the indicator or recorder apparatus 20 for a period proportional to the rate of flow of the liquid in conduit 2, and the indicator or pen arm 27 of said apparatus is positioned in accordance with said rate of flow. Said arm 27 may indicate the flow rate in conduit 2, as by making a continuous record of said rate on a chart 28.

Indicator or recording apparatus of the type above referred to is well-known in the art and specific description thereof is unnecessary.

The pen arm 27 is connected by a link 29 to a pivoted contactor 30 of a second transmitter, which includes a cam 31 continuously rotated at constant speed by a suitable motor connected by wires 33, 34 to a suitable current source. Cam 31 is of linear formation and is engaged by contactor 30 in each cycle of rotation of said cam for a period proportional to the position of the pen arm 27, or in other words, proportional to the rate of flow of liquid in the conduit 2.

A wire 36, connected to wire 34, is connected to cam 31 through a brush 37 engaging the cam shaft; while a wire 38 leads from contactor 30 to one terminal of a solenoid 39 (Fig. 3), of a suitable clutch apparatus designated 40 in Fig. 1. The other terminal of said solenoid is connected to a wire 35, which in turn is connected at its other end to wire 33. Thus, in each cycle of rotation of cam 31, a circuit is closed through solenoid 39 for a duration proportional to the flow rate of the liquid in conduit 2.

The clutch apparatus 40 includes, in addition to said solenoid 39, a clutch element 41 (Fig. 3) secured to the shaft of a continuously running motor 42, and a complemental clutch element 43 splined on a shaft 44. Said clutch element 43 is slidable on said shaft 44, so as to be shiftable into and out of engagement with the clutch element 41. Engaged with a grooved hub of said element 43 is the forked end of a lever 45, which carries an armature opposite the solenoid 39. Normally, a spring 46 maintains the lever 45 in the position shown in Fig. 3, with clutch element 43 out of engagement with element 41; but when said solenoid is energized the lever 45 is attracted to establish the clutch, with resultant rotation of shaft 44 by motor 42.

The motor 42 is connected by wires 47, 48, to a suitable source of current, and is continuously in operation at substantially constant speed. Fastened to the shaft 44 is an arm 49 which carries a light source 50, energized through wires 51, 52 connected to the respective wires 47, 48. Said arm 49 extends over the top of the scale head 7 and thence depends slightly downwardly, to carry a photo-electric cell unit 53 in line with said light source and on the same side of the scale head as the pointer 5.

Said pointer 5 and photo-electric unit 53 cooperate in a manner more particularly described hereinafter, to control a motor 54 which operates a valve in the conduit 1, thereby to regulate the rate of flow of liquid in said conduit. Said motor 54 is of any suitable reversible type and may, as is well understood, comprise a pair of field windings for causing rotation of its armature in opposite directions, respectively; one of said windings being connected by a wire 55 with a contact 56, and the other of said windings being connected by a wire 57 with a contact 58, both windings being furthermore connected by a common return wire 59 with a suitable source of current. Another wire 60 from said source is connected to a contact 61 carried by a resilient blade on an oscillating arm 62 driven by a pilot motor 63.

Motor 63 is of a well-known type comprising a field coil 64, which is continuously connected to the alternating current supply lines 65, 66, and further comprising a pair of shading coils 67, 68. A circuit through coil 67 is continuously closed through a resistance 69 in series with said coil, as shown. Coil 68 is connected through wires 70, 71, with the photo-electric cell 53, so that a low resistance circuit through said coil 68 is closed whenever light falls on said cell 53 from the source 50. As long as the circuit through coil 68 is open, the pilot motor 63 will run steadily in one direction, and as long as said circuit is closed, said motor will run steadily in the opposite direction. While in the present example of the invention the resistance in series with coil 67 is so chosen that the forward and reverse speeds are equal, it will be understood that, if desired, said resistance may be varied, through the manually adjustable contactor 72, to vary the ratio between the forward and reverse speeds to the extent desired.

As previously noted, the scale hand or pointer 5 rotates in response to loss of weight of the contents of the container 3, and its departure from its initial position on the face 6 corresponds with the integrated loss of said contents. The arm 49 and cell 53 are, on the other hand, rotated in accordance with the signals from the transmitter contactor 30 and cam 31, and their departure from their initial positions corresponds with the integrated values represented by said signals; said arm and cell remaining in the position to which they are moved by each operation of the clutch 40 and being moved through successive increments by successive energizations of said clutch in response to the signals. As shown, the arm 49 is pivoted concentrically with the pivot of the hand 5, and extends over the scale head 7 so that the light sensitive cell 53 is carried on the same side of said head as is the pointer 5. Said head, or the portion thereof between the light source 50 and cell 53, is transparent to permit light from the source 50 to pass therethrough. Projecting from an end of hand 5 is a mask or shutter 5' which prevents the light from source 50 from reaching the cell 53 when the hand 5 and arm 49 are so related as to bring said source and mask into alignment.

The operation of the embodiment above described is as follows:

As the weight in the container on the scale decreases, the scale pointer 5 carrying the mask 5' turns toward zero. The magnetic clutch 40 operates in response to the transmitter signals to shift the follow-up arm 49 and cell 53, in the same direction as the hand 5, through an extent in each cycle corresponding with the duration of the signal. When the hand 5 moves ahead of the arm 49, the beam from the source 86 is interrupted by the mask 5', opening the circuit of the shading coil 68 and causing the motor 63 to rotate in one direction. When the follow-up arm 49 moves ahead of the hand 5, the beam from source 50 falls upon the cell 53, the circuit of coil 68 is closed, and, with the adjustable resistance 69 set appropriately, the motor 63 rotates at the same speed in the opposite direction. As long as the rate of loss of weight of material from the container bears the desired relation to the flow rate in the conduit 2, the oscillating contact 62, driven by motor 63, simply moves back and forth without engaging either of the contacts 56, 58. However, if the circuit of the shading coil 68 remains open longer than closed (i. e., the rate of loss of weight from the container is too great) the oscillating contact 62 engages contact 56, thereby setting motor 54 into operation in the proper direction for moving the valve in conduit 1 toward closed position, thereby reducing the rate of loss of weight from said container. If, on the other hand, the circuit of coil 68 remains closed longer than open (i. e., the rate of loss of weight from the container is too low) the contact 62 engages contact 58, bringing motor 54 into operation in the direction for opening said valve in conduit 1, thus increasing the rate of loss of weight from said container. The rate of withdrawal of material from the container is thus maintained in predetermined proportion to the flow rate in the conduit 2. Said proportion may be varied at will by manual adjustment of contactor 30; for which purpose said contactor is shown engaged at one end in the groove of a sleeve 73 which has a threaded interior bore engaging a threaded end portion of the link 29. By turning said sleeve 73 through the thumb nut 74 secured to one end thereof, the position of the contactor 30 with respect to cam 31 may be altered, whereby the ratio of the rate of withdrawal of the liquid from container 3 to the rate of flow of liquid in the conduit 2 may be varied as desired.

While I have illustrated the magnetic clutch as energized by signals corresponding to rate of flow of fluid in a conduit, it will be obvious that said signals may correspond to values of any other master quantity, and that the utility of the invention is not restricted to control by any particular master quantity. It will also be evident that the signals from the cam 15 and contactor 19 of the primary transmitter may be sent directly to the magnetic clutch instead of by way of a recorder and secondary transmitter. When the signals are sent directly from said primary transmitter to the magnetic clutch, the contactor 19 may be mounted adjustably on the stem of the float 14, to vary the proportion between the rate of withdrawal of the liquid from the container to the rate of flow in the conduit 2. It is also apparent that the proportion may be varied by interposing an adjustable speed drive between the motor 42 and the clutch member 41. As a further alternative, it will be apparent that the rod 29 connected adjustably to contactor 30 could be operated directly by the float, or by any other variable-responsive element.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for proportioning one substance to another, said apparatus comprising a source of supply of one of said substances, means providing for continuous delivery of said substance from said source, means responsive to loss of weight of said source, means responsive to rate of delivery of the other of said substances, and means controlled jointly by the two last mentioned means for regulating the rate of delivery of the first substance in predetermined proportion to that of said other.

2. Apparatus for proportioning one substance to another, said apparatus comprising a source of supply of one of said substances, means responsive to loss of weight of said source, means for telemetering in uniform time cycles signals corresponding with the rate of delivery of the second of said substances, light sensitive means controlled jointly by the first mentioned means and said signals, and means governed by said light sensitive means for regulating the rate of delivery of the first substance in predetermined proportion to that of said second substance.

RUDY P. LOWE.